US006374260B1

(12) United States Patent
Hoffert et al.

(10) Patent No.: US 6,374,260 B1
(45) Date of Patent: Apr. 16, 2002

(54) METHOD AND APPARATUS FOR UPLOADING, INDEXING, ANALYZING, AND SEARCHING MEDIA CONTENT

(75) Inventors: Eric M. Hoffert, San Francisco; Karl Cremin, Mountain View, both of CA (US); Adnan Ali, London (CA); Stephen R. Smoot, San Francisco; Brian Strull, Campbell, both of CA (US)

(73) Assignee: Magnifi, Inc., Cupertino, CA (US)

( * ) Notice: Subject to any disclaimer, the term of this patent is extended or adjusted under 35 U.S.C. 154(b) by 0 days.

(21) Appl. No.: 09/514,576

(22) Filed: Feb. 28, 2000

Related U.S. Application Data

(63) Continuation-in-part of application No. 09/280,173, filed on Mar. 29, 1999, now Pat. No. 6,282,549, which is a continuation of application No. 08/847,158, filed on Apr. 30, 1997, now Pat. No. 5,903,892
(60) Provisional application No. 60/018,312, filed on May 24, 1996, provisional application No. 60/018,311, filed on May 24, 1996, provisional application No. 60/018,238, filed on May 24, 1996, provisional application No. 60/021,452, filed on Jul. 10, 1996, provisional application No. 60/021,515, filed on Jul. 10, 1996, provisional application No. 60/021,517, filed on Jul. 10, 1996, provisional application No. 60/021,466, filed on Jul. 10, 1996, provisional application No. 60/023,634, filed on Aug. 9, 1996, provisional application No. 60/023,633, filed on Aug. 9, 1996, and provisional application No. 60/023,836, filed on Aug. 12, 1996.

(51) Int. Cl.$^7$ ............................................. G06F 17/30

(52) U.S. Cl. ..................... 707/104.1; 707/3; 707/10; 707/101; 345/716

(58) Field of Search .............................. 707/101, 102, 707/103, 104, 500, 3, 10; 345/339, 716; 382/296

(56) References Cited

U.S. PATENT DOCUMENTS

| | | | | |
|---|---|---|---|---|
| 4,772,941 A | | 9/1988 | Noble | 348/57 |
| 5,136,618 A | | 8/1992 | Wright, Jr. | 375/240 |
| 5,493,677 A | * | 2/1996 | Balogh et al. | 707/104 |
| 5,524,193 A | | 6/1996 | Covington et al. | 707/512 |
| 5,553,281 A | * | 9/1996 | Brown et al. | 707/104 |
| 5,600,775 A | | 2/1997 | King et al. | 707/500 |
| 5,617,119 A | | 4/1997 | Briggs et al. | 707/100 |
| 5,655,117 A | | 8/1997 | Goldberg et al. | 707/102 |
| 5,677,708 A | | 10/1997 | Matthews, III et al. | 345/684 |
| 5,687,331 A | | 11/1997 | Volk et al. | 345/840 |
| 5,706,290 A | | 1/1998 | Shaw et al. | 370/465 |
| 5,713,021 A | | 1/1998 | Kondo et al. | 707/103 |
| 5,727,141 A | | 3/1998 | Hoddie et al. | 345/475 |
| 5,729,471 A | | 3/1998 | Jain et al. | 364/514 |
| 5,729,741 A | | 3/1998 | Liaguno et al. | 707/104.1 |
| 5,737,619 A | | 4/1998 | Judson | 707/500 |
| 5,742,816 A | | 4/1998 | Barr et al. | 707/3 |
| 5,751,338 A | | 5/1998 | Ludwig, Jr. | 348/14.12 |
| 5,751,771 A | | 5/1998 | Katsumata et al. | 375/240 |
| 5,761,655 A | * | 6/1998 | Hoffman | 707/4 |
| 5,764,276 A | | 6/1998 | Martin et al. | 725/146 |
| 5,778,190 A | | 7/1998 | Agarwal | 709/247 |

(List continued on next page.)

OTHER PUBLICATIONS

"Informedia™ Digital Video Library: Integrated Speexch, Image and Language Understanding for Creation and Exploration of Digital Libraries," Carnegie Mellon University, Nov., 1994.

*Primary Examiner*—Paul R. Lintz
*Assistant Examiner*—Ella Colbert
(74) *Attorney, Agent, or Firm*—Blakely, Sokoloff, Taylor & Zafman, LLP

(57) ABSTRACT

A method and apparatus for uploading, analyzing, searching and displaying multimedia files based on the context and content of the multimedia files.

59 Claims, 12 Drawing Sheets

U.S. PATENT DOCUMENTS

| | | | |
|---|---|---|---|
| 5,778,372 A | * 7/1998 | Cordell et al. | 707/100 |
| 5,786,856 A | 7/1998 | Hall et al. | 348/403 |
| 5,797,008 A | 8/1998 | Burrows | 707/101 |
| 5,805,821 A | 9/1998 | Saxena et al. | 709/231 |
| 5,809,299 A | 9/1998 | Cloutier et al. | 707/10 |
| 5,818,978 A | 10/1998 | Al-Hussein | 382/296 |
| 5,852,435 A | 12/1998 | Vigneaux | 345/302 |
| 5,870,754 A | 2/1999 | Dimitrova et al. | 707/104.1 |
| 5,873,076 A | 2/1999 | Barr et al. | 707/3 |
| 5,884,056 A | 3/1999 | Steele | 345/738 |
| 5,895,477 A | 4/1999 | Orr et al. | 707/517 |
| 5,903,892 A | 5/1999 | Hoffert et al. | 707/10 |
| 5,943,046 A | 8/1999 | Cave et al. | 345/327 |
| 5,982,350 A | * 11/1999 | Hekmatpour et al. | 345/113 |
| 6,029,195 A | * 2/2000 | Herz | 709/219 |
| 6,035,330 A | * 3/2000 | Astiz et al. | 709/218 |
| 6,081,278 A | 6/2000 | Chen | 345/473 |
| 6,172,672 B1 | 1/2001 | Ramasubramanian et al. | 345/327 |

* cited by examiner

US 6,374,260 B1

METHOD AND APPARATUS FOR UPLOADING, INDEXING, ANALYZING, AND SEARCHING MEDIA CONTENT

RELATED APPLICATIONS

This application is a continuation-in-part of application Ser. No. 09/280,173, now U.S. Pat. No. 6,282,549 issued Aug. 28, 2001 filed Mar. 29,1999, which is a continuation of application Ser. No. 08/847,158, now U.S. Pat. No. 5,903, 892 issued May 11, 1999 filed Apr. 30, 1997, which claims the benefit of the following co-pending U.S. Provisional Applications:

1) Method and Apparatus for Processing Context and Content of Multimedia Files When Creating Searchable Indices of Multimedia Content on Large, Distributed Networks; Ser. No.: 60/018,312; Filed: May 24,1996, now abandoned;
2) Method and Apparatus for Display of Results of a Search Queries for Multimedia Files; Ser. No.: 60/018, 311; Filed: May 24,1996, now abandoned;
3) Method for Increasing Overall Performance of Obtaining Search Results When Searching on a Large, Distributed Database By Prioritizing Database Segments to be Searched; Ser. No.: 60/018,238, Filed: May 24, 1996, now abandoned;
4) Method for Processing Audio Files to Compute Estimates of Music-Speech Content and Volume Levels to Enable Enhanced Searching of Multimedia Databases; Ser. No.: 60/021,452; Filed: Jul. 10,1996, now abandoned;
5) Method for Searching for Copyrighted Works on Large, Distributed Networks; Ser. No.: 60/021,515; Filed: Jul.10, 1996, now abandoned;
6) Method for Processing Video Files to Compute Estimates of Motion Content, Brightness, Contrast and Color to Enable Enhanced Searching of Multimedia Databases; Ser. No.: 60/021,517; Filed: Jul. 10,1996, now abandoned;
7) Method and Apparatus for Displaying Results of Search Queries for Multimedia Files; Ser. No.: 60/021, 466; Filed: Jul. 10,1996, now abandoned;
8) A Method for Indexing Stored Streaming Multimedia Content When Creating Searchable Indices of Multimedia Content on Large, Distributed Networks; Ser. No.: 60/023,634; Filed: Aug. 9, 1996, now abandoned;
9) An algorithm for Exploiting Lexical Proximity When Performing Searches of Multimedia Content on Large, Distributed Networks; Ser. No.: 60/023,633; Filed: Aug. 9, 1996, now abandoned; and
10) A Method for Synthesizing Descriptive Summaries of Media Content When Creating Searchable Indices of Multimedia Content on Large, Distributed Networks; Ser. No.: 60/023,836; Filed: Aug. 12, 1996, now abandoned.

BACKGROUND OF THE INVENTION

1. Field of the Invention

The present invention relates to the field of uploading, analyzing, searching, retrieval and display of information.

2. Description of the Related Art

Wouldn't it be useful to be able to log onto an extranet or intranet system and be able to upload and search for key corporate marketing or advertising information, such as "Please find me the latest version of the new advertising campaign elements for print, broadcast and web media", or "Please locate the work in progress marketing presentation associated with our upcoming product line ?", and show me a preview of portions of the presentation to make sure I am accessing the right version with the colored graphic". A company may want to implement this uploading and searching capability on its intranet or extranet or on the World Wide Web (WWW, or simply "the web").

Unfortunately, text based search algorithms cannot answer such queries. Yet, text based search tools are the predominate search tools available on the Internet today. Even if text based search algorithms are enhanced to examine files for file type and, therefore, be able to detect whether a file is a audio, video or other multimedia file, little if any information is available about the content of the file beyond its file type.

Further still, what if the search returns a number of files. Which one is right? Can the user tell from looking at the title of the document or some brief text contained in the document as is done by many present day search engines? In the case of relatively small text files, downloading one or two or three "wrong" files, when searching for the right file, is not a major problem. However, when downloading relatively large multimedia files, it may be problematic to download the files without having a degree of assurance that the correct file has been found.

SUMMARY OF THE INVENTION

It is desirable to provide an uploading and search engine that is capable of uploading media content and searching an extranet, intranet or the Internet, or other large distributed networks for multimedia information. It is also desirable that the uploading and search engine provides for analysis of the content of files found in the search and for display of previews of the information.

Figure 1:
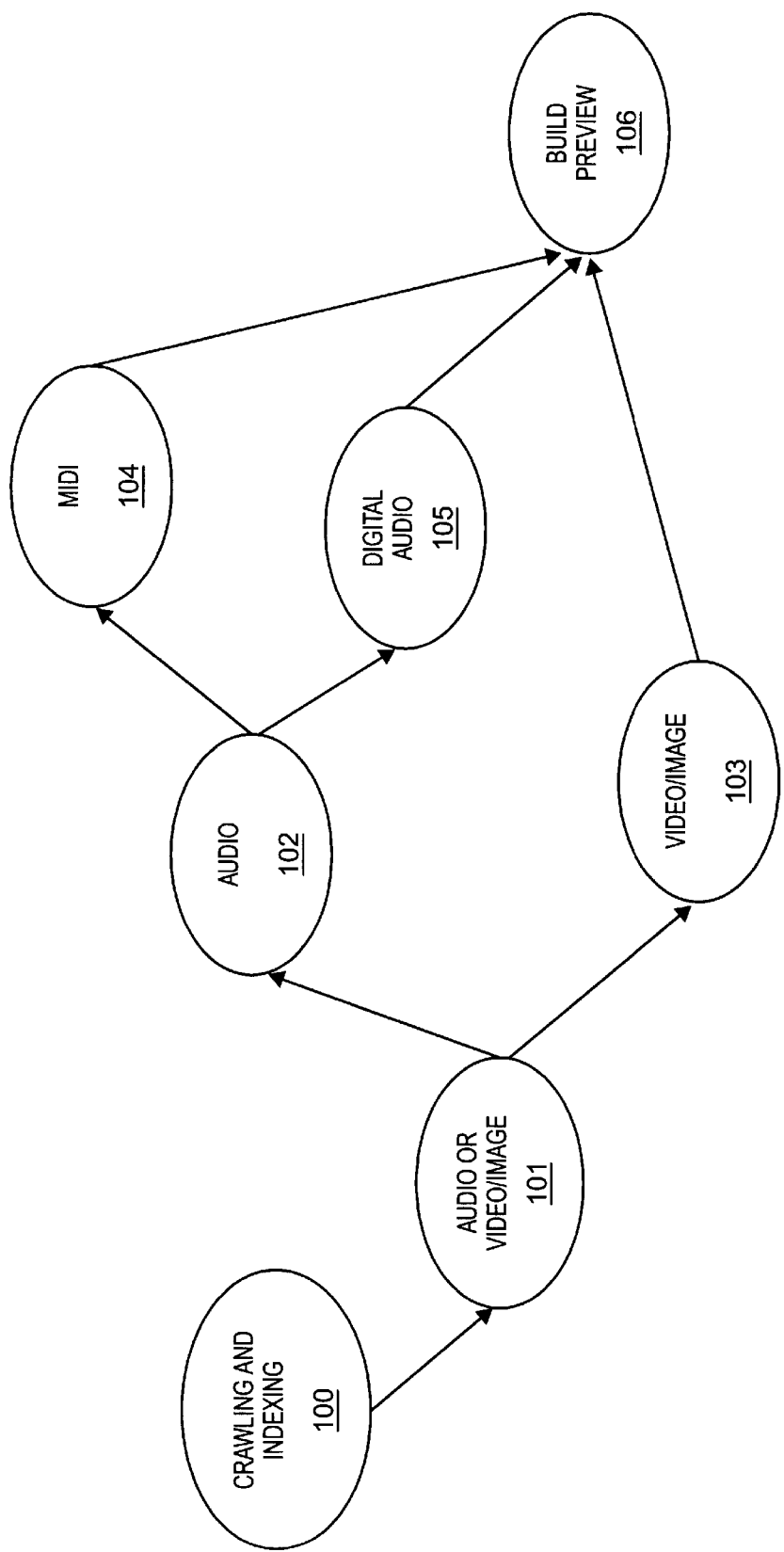
FIG. 1 illustrates an overall diagram of a media search and retrieval system as may implement the present inventions.
Figure 3:
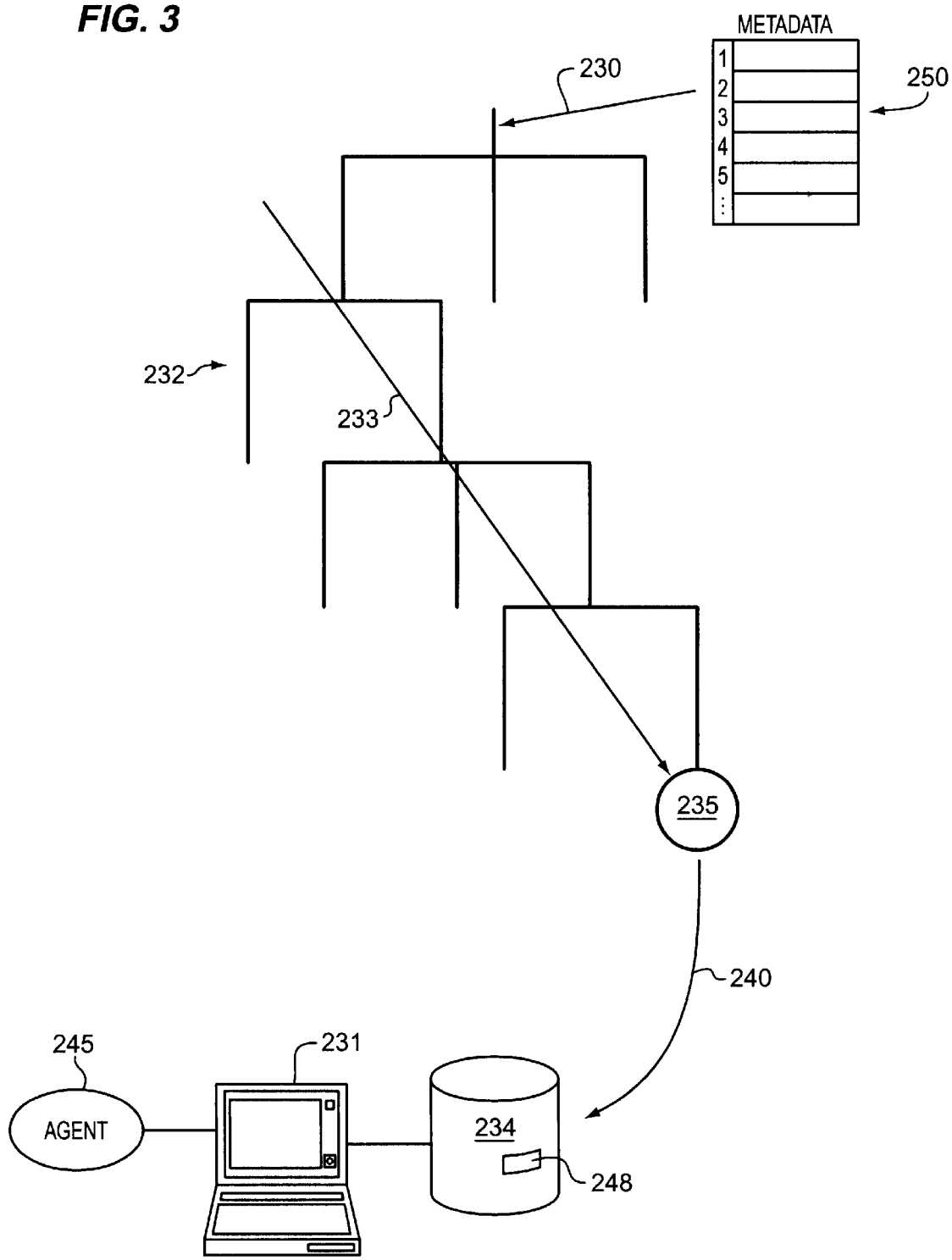
FIG. 3 illustrates an embodiment of the present inventions.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS

What is described herein is a method and apparatus for searching for, indexing and retrieving information in a large, distributed network.

1.0 Overview

FIG. 1 provides an overview of a system implementing various aspects of the present invention. As was stated above, it is desirable to provide a system that will allow searching of media files on a distributed network such as the Internet or, alternatively, intranets. It would be desirable if such a system were capable of crawling and/or browsing the network, indexing media files, generating previews of the media files, examining and analyzing the content of the media files, and presenting summaries of the content of the media files to users of the system to assist the users in selecting a desired media file.

The embodiments described herein may be broken down into 3 key components: (1) searching and indexing of the network to discover multimedia files and to index them 100; (2) examining the media files for content (101–105); and (3) building previews which allow a user to easily identify media objects of interest 106. As will be appreciated, each of these phases of the embodiments provides for unique methods and apparatus for allowing advanced media queries.

In the preferred embodiment of the invention, a distributed architecture is utilized to provide for the above key components, in which one or more databases, database servers, application servers, web browsers, and media servers are distributed over an internetwork of computing systems. Media files are processed by a multi-tier application service comprising logical components including an application server, a web server, a data base server and a media server. In one embodiment, the logical components reside on different physical servers. Moreover, each tier of the multi-tier application service may be replicated one or more times in a clustered representation and execute on different physical servers. As an example, the application and web servers are executed remotely on different physical servers than the database server that executes at a central location.

While the present invention is primarily concerned with uploading, searching, indexing, analyzing and previewing digital video, animation, compressed video (e.g., panoramic images), and 3D images, it is appreciated that the methods and apparatus described herein are equally applicable to other types of corporate and office media, such as JPEG, MPEG (both audio and video), Microsoft PowerPoint data, Microsoft Excel graphics, Adobe Acrobat documents, etc.

2.0 Media Crawling and Indexing

Figure 2A:
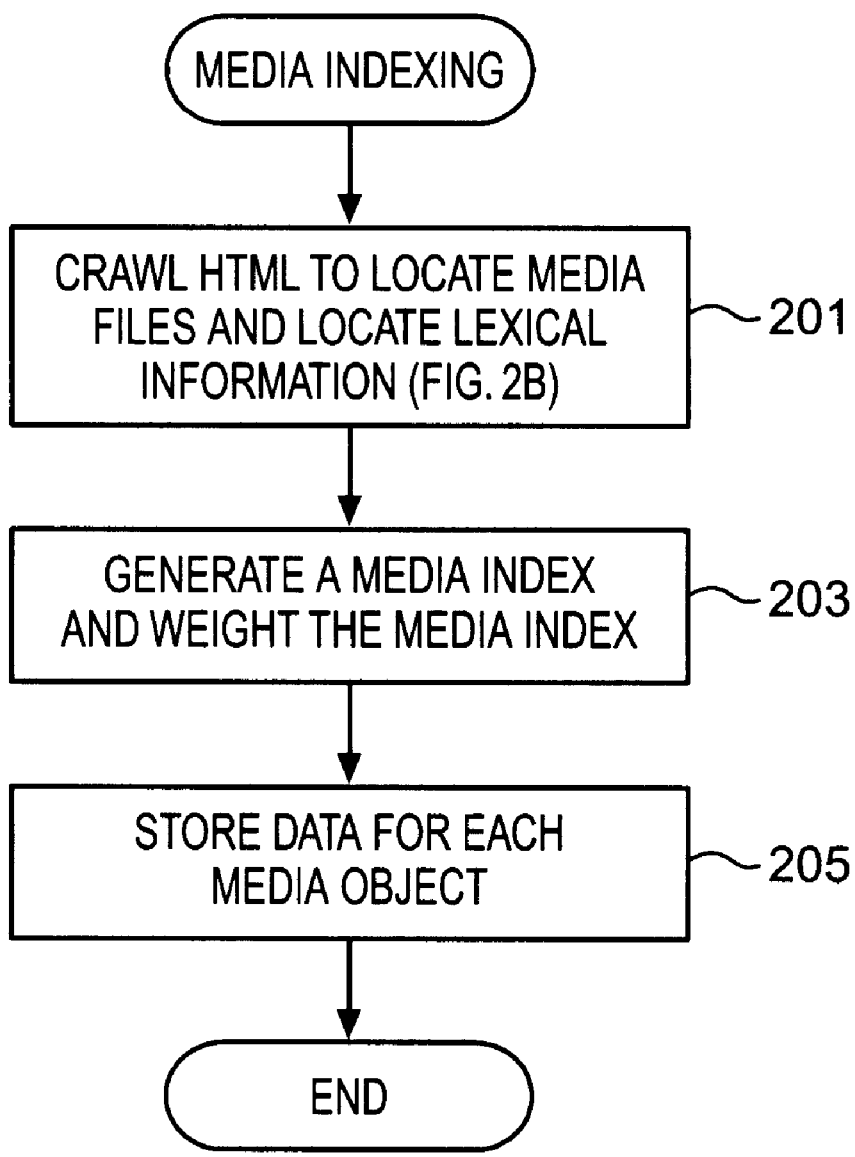
FIGS. 2A–C illustrates a flow diagram of a method of media crawling and indexing as may utilize the present inventions.
Figure 2B:
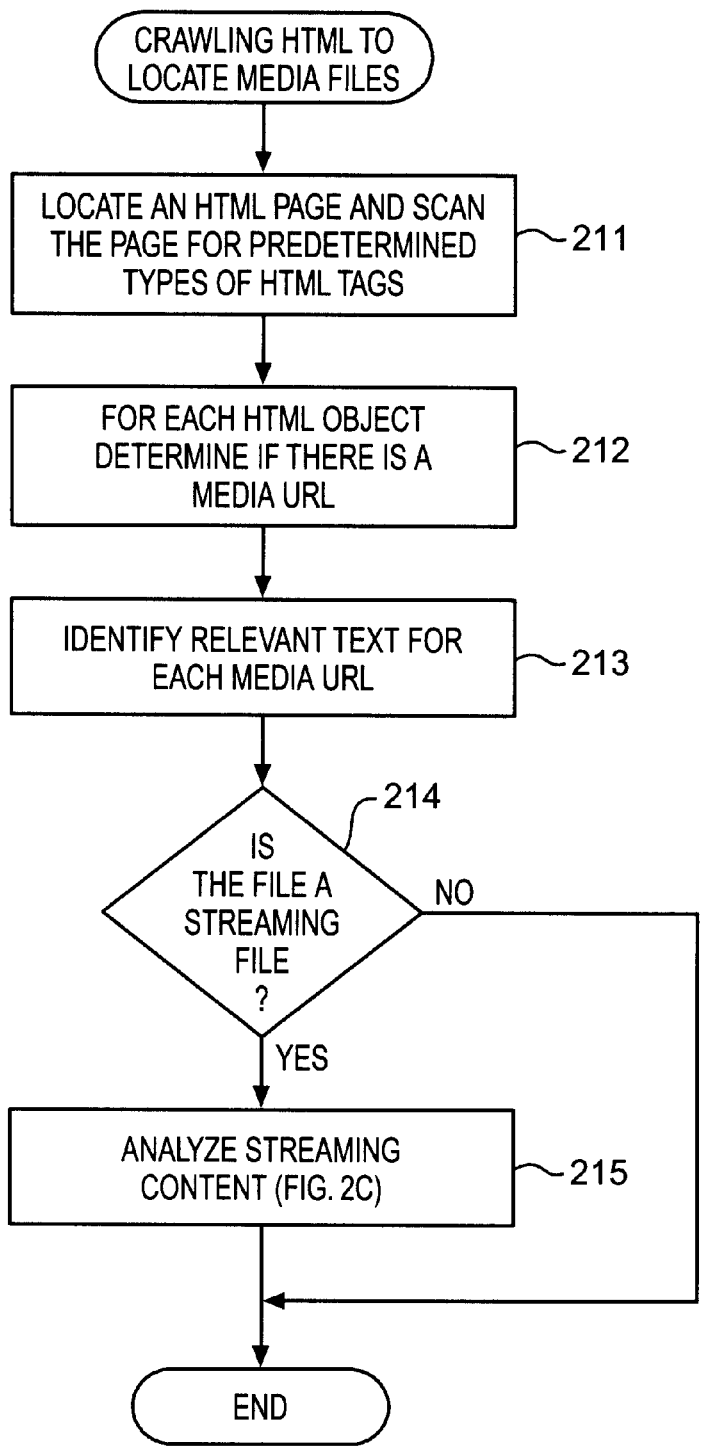
Figure 2C:
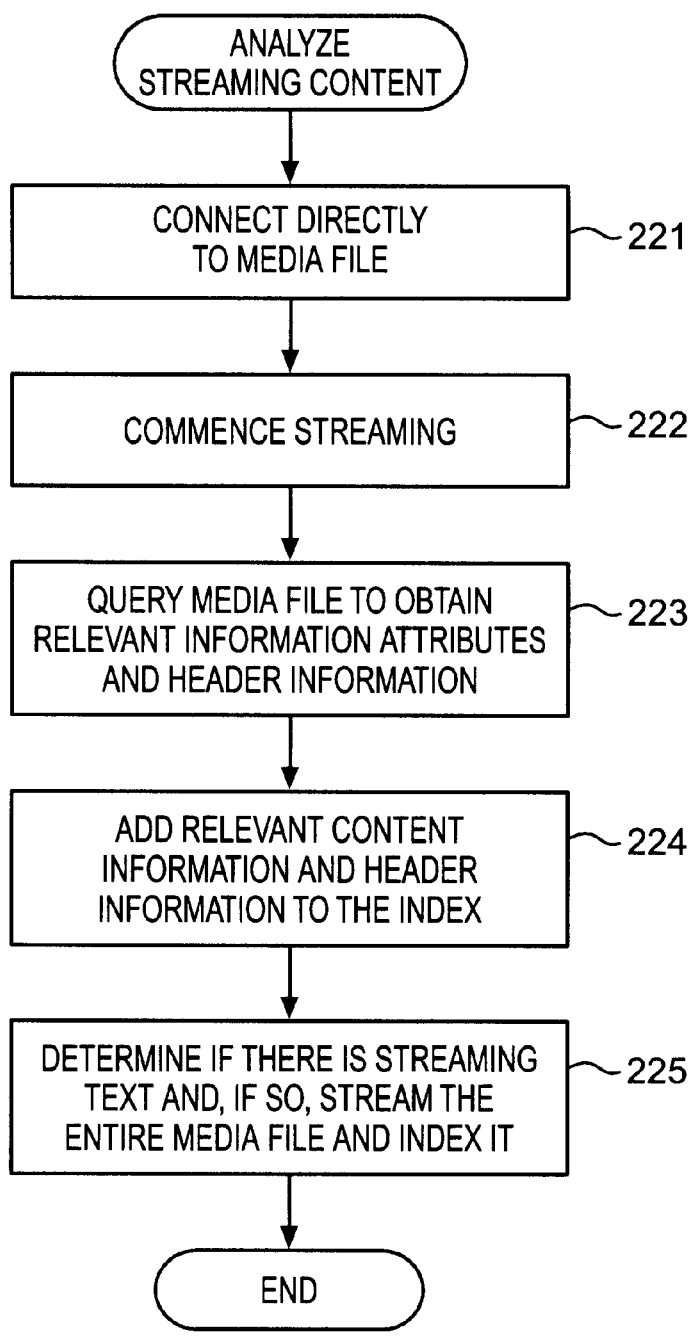

FIGS. 2A–2C provides a description of a method for crawling and indexing a network to identify and index media files. Hypertext markup language (HTML) in the network is crawled to locate media files, block 201. Lexical information (i.e., textual descriptions) is located describing the media files, block 202 and a media index is generated, block 203. The media index is then weighted, block 204 and data is stored for each media object, block 205. Each of these steps will be described in greater detail below.

2.1 Crawl HTML to locate media files

The method of the described embodiment for crawling HTML to locate media files is illustrated in greater detail by FIG. 2B. Generally, a process as used by the present invention may be described as follows:

The crawler starts with a seed of multimedia specific URL sites to begin its search. Each seed site is handled by a separate thread for use in a multithreaded environment. Each thread parses HTML pages (using a tokenizer with lexical analysis) and follows outgoing links from a page to search for new references to media files. Outgoing links from an HTML page are either absolute or relative references. Relative references are concatenated with the base URL to generate an absolute pathname. Each new page that is parsed is searched for media file references. When a new site is found by the crawler, there is a check against the internal database to ensure that the site has not already been visited (within a small period of time); this guarantees that the crawler only indexes unique sites within its database, and does not index the same site repeatedly. A hash table scheme is used to guarantee that only unique new URLs are added to the database. The URL of a link is mapped into a single bit in a storage area that can contain up to approximately ten million URLs. If any URL link that is found hashes to the same bit position, then the URL is not added to the list of URLs for processing. As the crawler crawls the web, those pages that contain media references receive a higher priority for processing than those pages which do not reference media. As a result, pages linked to media specific pages will be visited by the crawler first in an attempt to index media related pages more quickly than through conventional crawler techniques.

When entering a new site, the crawler scans for a robot exclusion protocol file. If the file is present, it indicates those directories that should not be scanned for information. The crawler will not index material that is disallowed by the optional robot exclusion file. On a per directory basis, there is proposed to be stored a media description file (termed for purposes of this application the mediaX file). This file contains a series of records of textual information for each media file within the current directory. As will be discussed in greater detail below, the crawler scans for the media description file in each directory at a web site, and adds the text based information stored there into the index being created by the crawler. The mediaX file allows for storage of information such as additional keywords, abstract and classification data. Since the mediaX file is stored directly within the directory where the media file resides, it ensures an implicit authentication process whereby the content provider can enhance the searchable aspects of the multimedia information and can do so in a secure manner.

The crawler can be constrained to operate completely within a single parent URL. In this case, the user inputs a single URL corresponding to a single web site. The crawler will then only follow outgoing links that are relative to the base URL for the site. All absolute links will not be followed. By following only those links which are relative to the base URL, only those web pages which are within a single web site will be visited, resulting in a search and indexing pass of a single web site. This allows for the crawling and indexing of a single media-rich web site. Once a single web site has had an index created, then users may submit queries to find content located only at the web site of interest. This scheme will work for what is commonly referred to as "Intranet" sites, where a media-rich web site is located behind a corporate firewall, or for commercial web sites containing large multimedia datasets.

2.1.1 Scan page for predetermined HTML tag types

Each HTML page is scanned for predetermined types of HTML tags, block 211. In this embodiment, the following tags are scanned for:

tables (single row and multi-row)
lists (ordered and unordered)
headings
java script
client side image maps
server side image maps
header separators 2.1.2 Determine if there is a media URL If there is a media uniform resource locator (URL), block 212, then the media URL is located and stored. However, in the described embodiment, certain media URLs may be excluded. For example, an embodiment may choose not to index URLs having certain keywords in the URL, certain prefixes, certain suffixes or particular selected URLs.

2.1.3 Locating relevant lexical information

Next, relevant lexical information (text) is selected for each URL. Often a web page that references a media file provides significant description of the media file as textual information on the web page. When indexing a media file, the present invention has recognized that it would be useful to utilize this textual information. However, certain web pages may reference only a single media file, while other web pages may reference a plurality of media files. In addition, certain lexical information on the web page may be more relevant than other information to categorizing the media for later searching.

It has been observed that relevant textual information may be directly surrounding the media reference on a web page, or it may be far from the media reference. However, it has been found that more often than not, the relevant text is very close (in lexical distance) to the media reference. Therefore, the following general rules are applied when associating lexical information with a media file:

1) if the media file reference is found within a table, store the text within the table element as associated with the media file;
2) if the media file reference is found within a list, store the text within the list element as associated with the media file;
3) store the text in the heading as associated with the media file. In addition, in some embodiments, the text within higher level headings may also be stored.
4) if there is javascript, store the text associated with the javascript tag;
5) for client and server side image maps, if there is no relevant text, store only the URL. In addition, the image maps may be parsed to obtain all unique URLs and these may also be stored.

In addition to the above-described processes for locating relevant lexical information, in the described embodiment, certain information is generally stored for all media URL's. In particular, the following information is stored:

the name of the media file

URL of the media file text string which is associated with the media file anchor reference title of the HTML document containing the media file keywords associated with the HTML document URL for the HTML document containing the media file reference keywords embedded in the media file textual annotations in the media file script dialogue, closed captioning and lyric data in the media file auxiliary data in the media file (copyright, author, producer, etc.)

auxiliary data located within the media reference in the HTML document auxiliary data located in an associated media description file 2.1.4 Streaming files Media content of files may be stored as downloadable files or as streaming files. Downloadable content is indexed by connecting to an HTTP server, downloading the media file, and then analyzing the file for the purposes of building a media rich index.

In the case of streaming multimedia content, block 214, an HTTP server stores not the content itself, but a reference to the media file. Therefore, the process of indexing such a file is not as straightforward as for a downloadable file that is stored on the HTTP server and may be downloaded from the server.

In the case of streaming media files certain information is gathered, block 215, as will be described with reference to FIG. 2C.

Below is described a method for indexing streaming files to index audio content and to index video content:

download the media file reference corresponding to the correct streaming media type for each URL listed in the media file reference, perform the following operation:
connect directly to the media file on the media server where it resides, block 221
commence streaming of the media on the appropriate TCP socket, block 222
query the streaming media to obtain appropriate content attributes and header data, block 223
add all relevant content attributes and header information into the media rich index, block 224 (header information to be queried and indexed includes title, author, copyright; in the case of a video media file, additional information indexed may also include duration, video resolution, frame rate, etc.)
determine if streaming text or synchronized multimedia information, is included, block 225.
if it is, then stream the entire media clip, and index all text within the synchronized media track of the media file
if possible, store the time code for each block of text which occurs with the streaming media This method can be applied to any streaming technology, including both streaming sound and video. The media data which is indexed includes information which is resident in the file header (i.e., title, author, copyright), and which can be computed or analyzed based on information in the media file (i.e., sound volume level, video color and brightness, etc.).

The latter category of information includes content attributes that can be computed while the media is streaming, or after the media has completed streaming from a server. It should be noted that once the streaming media has been queried and received results back from the server, the streaming process can conclude as the indexing is complete.

2.2 Generate and weight a media index

As the network is crawled, a media index is generated by storing the information that has been discussed above in an index format. The media index is weighted to provide for increased accuracy in the searching capabilities. In the described embodiment, the weighing scheme is applied factoring a weight factor for each of the following text items:

| ITEM | WEIGHTING FACTOR |
| --- | --- |
| URL of the media file | 10 |
| Keywords embedded in the media file | 10 |
| Textural annotations in the media file | 10 |
| Script dialogue, lyrics, and closed captioning in the media file | 10 |

| ITEM | WEIGHTING FACTOR |
| --- | --- |
| Text strings associated with the media file anchor reference | 9 |
| Text surrounding the media file reference | 7 |
| Title of the HTML document containing the media file | 6 |
| Keywords and meta-tags associated with the HTML document | 6 |
| URL for the HTML document containing the media file reference | 5 |

In other embodiments, alternative weighting factors may be utilized without departure from the present invention.

2.3 Store data for each media object

Finally, data describing each media object is stored for each media object. This data describing the media object is also referred to as metadata. In the described embodiment, the following data is stored:

Relevant text

HTML document title

HTML meta tags

Media specific text (e.g., closed captioning, annotations, etc.)

Media URL

Anchor text

Content previews (discussed below)

Content attributes (such as brightness, color or B/W, contrast, speech v. music and volume level. In addition, sampling rate, frame rate, number of tracks, data rate, size may be stored).

Of course, in alternative embodiments a subset or superset of these fields may be used.

3.0 Uploading Media and Indexing

In the above-described embodiment of the invention, media content or, more specifically, files containing media content are located by crawling the web using an automated tool. The media content is weighted and indexed as described, and then metadata, that is, data about or describing the media content, is stored for later analysis. The above described crawler provides systematic coverage, or searching, of a tree wherein the scope of the tree generally may be limited by indicating a URL that defines the base of the tree. By indexing the media content, the source or location of the media content remains unchanged, and the media content is maintained in the location and state it was in prior to the crawling and indexing. Described below are the steps for uploading, manually, or in bulk fashion, as well as updating the uploaded media content, and indexing the same.

3.1 Manual Uploading

In alternative embodiments, searching for media content may be performed by a user, whether the media content is located on the web, a server reachable over an intranet or a locally accessible storage medium. The media content, or a copy thereof, after being located by a user, is transferred from the source location, i.e., the location at which the media content was found by the user, to a managed or central location specified by the user. For example, with reference to FIG. 3, a user searches for a specific file 235 comprising media content. The user utilizes an appropriate software application tool, e.g., a web browser or finder program such as Microsoft Finder, executing on computer system 231 to search for and locate specific files containing media content. The user searches or browses a tree 232 starting at the root 230 of the tree and traversing a path 233 to a leaf 235 of the tree that contains the media content. In one embodiment, the tree represents a series of hierarchical paths such as may be exist on the web, wherein a particular path from the root to the leaf is identified by the a uniform resource locator, and the leaf represents a web page comprising media content. Alternatively, the tree represents a hierarchical series of folders such as may be found in a file system accessible to the user, e.g., a file system maintained on a permanent storage medium 234 coupled to computer system 231, or maintained in a distributed manner over a network to which system 231 is attached and over which the user may access one or more other computer systems, such as in a client-server computing environment. In this embodiment, when the user manually locates media content by manually traversing an HTML or file directory, a file comprising the media content, or a copy thereof, is transferred to a managed or central site, rather than indexing the media as described above in the previous section. The central or managed site may be specified as a particular HTML or file directory that is readily and relatively quickly accessible to the user.

For example, with reference to FIG. 3, a user running a web browser application on computer system 231 searches for and locates media file 235 in a web page, and using a protocol such as HTTP, loads the media file to permanent storage device 234, e.g., a hard disk drive, accessible to computer system 231. In one embodiment, storage device 234 provides permanent storage solely to computer system 231, as in a hard disk drive installed in computer system 231, and in another embodiment, storage device 234 is associated with a server accessible to computer system 231 where the system is a client of the server.

3.2 Bulk Loading of Media Content

"Bulk loading" may be utilized in an embodiment of the inventions to load from a specified point or root in a HTML or file directory every media file of every media type in every HTML directory or file folder thereunder to replicate and maintain the HTML or file folder structure. Bulk loading essentially employs the method set forth above in section 3.1, operating on a set or directory of files as a group rather than on individual files.

In accordance with the invention, a user defines a root 230 of an HTML or file directory, and initiates a bulk loading program, which then traverses each path in the directory, searching for media content. The program may be executed on the user's computer system 231 or on a server. If a metadata file 250 exists for the directory, then as each media file of interest is identified and copied to the managed site or central server, the metadata for the media file of interest is also copied from the metadata file 250 and stored in the metadata record (in metadata database 248) associated with the copied media file. The merging of the metadata records for the media files found in the directory into the metadata database provides a powerful tool for later searching the central server for uploaded media content and analyzing the same, as described below.

3.3 Updating Media Content

This raises the question of what happens when changes to the media content occurs at it source, say, a file comprising media is added or altered thereby providing new or different media content. A software agent 245, whether residing on user system 231, a server (e.g., file server 234) to which the media content was copied, or elsewhere in the network, may be enabled to monitor the source of the media content. When new or different media content is detected at the source, a new copy of the file comprising the media content is copied to the central/managed site. Moreover, the software agent alternatively may operate in or, in conjunction with, the earlier described automated web crawling embodiment as well, to index or update the index to the new media content.

It should be appreciated that the definition of "new" media content may cover not only new media content, i.e., media content that did not physically exist the last time the web crawler automatically searched for the content, or the last time a user manually searched for the media content. New media content may also comprise existing media content that either has not been indexed by the crawler, or loaded by a user, based on different set of predetermined characteristics that were first used to locate the media content of interest. For media content that previously was copied, the predetermined characteristics of the original source of the media content may be examined with or without reference to the metadata associated with the copy of the media content. For example, a comparison of attributes and characteristics of the source media file with the metadata maintained for the copy of the media file may indicate the content has changed and a copy should therefore be loaded to the managed site.

The agent may operate in an automated fashion, e.g., on a time schedule, as in polling, or when triggered by an event. Alternatively, the agent may be manually initiated by the user, for example, when an examination or comparison of the attributes and predetermined characteristics of the media content with the attributes/characteristics of the copy of the media content maintained at the managed site indicate that new or different media content of interest to the user exists.

3.4 Annotating Uploaded Media Content

The user may annotate the media file either before or after the media file is uploaded to the managed or central storage facility. The annotations may be free form text, e.g., a note or comment about the contents of the media file. Alternatively, the annotations may be a fixed value, a scalar value, or a value selected from a set or range of values, indicating, for example, the degree to which the content satisfies a user specified criteria. These annotations comprise metadata describing the media file. In one embodiment, the metadata for each media file so loaded is maintained in a record in a metadata database 248. The user thereafter can search through the metadata database to identify, locate and analyze the media file, as well as information about the media file, rather than searching the web or file system again for the media file. Additionally, such information as the filename of the file containing media content, textual data in the media file (e.g., closed captioning, annotations within the file, etc.), content previews, and content attributes, may be stored in the metadata database. As set forth above, the media content may further be indexed and metadata stored, just as in the case of crawling the web to locate media content, as opposed to uploading media content as described in this section.

3.5 Metering and Billing for Storage and Bandwidth Utilization above a Specified Threshold The user(s) of such a system may begin to store large numbers of documents that are manually or automatically uploaded as single files, or batch uploaded as a group of files (and with associated metadata). If the storage of such media files and documents is provided as a commmercial service to a corporation, it is economical and prudent to charge the corporate customer for storage and bandwidth utilization that takes place above a specified threshold. By metering the storage and bandwidth utilization on a regular basis, usage can be tracked, and usage exceeding specific limits can be triggered to result in billing the client for the additional system utilization.

4.0 Content analysis

As was briefly mentioned above, it is desirable to not only search the lexical content surrounding a media file, but also to search the content of the media file itself in order to provide a more meaningful database of information to search.

As was shown in FIG. 1, the present invention is generally concerned with indexing two types of media files (i) audio 102 and (ii) video 103.

5.0 Previews

The described embodiments are concerned with parsing media content files and building low-bandwidth previews of higher bandwidth data files. This allows rapid previewing of media data files, without the need to download, or if the media file is loaded, without the need to display, the entire file.

5.1 Preview Overview

In the described embodiment, for video media files, a preview mechanism has been developed. A sample of the results of a search, showing a filmstrip preview of the media is given in FIGS. 4A, 4B, 4F and 4G.

The filmstrip preview is explained in greater detail with reference to FIG. 4B. FIG. 4B illustrates a filmstrip preview 410. The filmstrip preview comprises a first sprocket area 411 at the top of the preview and a second sprocket area at the bottom of the preview, a frame area generally having three frames of images of height FH 412 and width FW 413. The filmstrip preview itself is of height H 414 and width W 415. In addition, in certain embodiments, the filmstrip preview may include a copyright area 416 for providing copyright information relating to the filmstrip preview and certain embodiments may contain an area, for example in the upper left hand corner of the first sprocket area 411, for a corporate logo or other branding information.

The thumbnail preview is explained with reference to FIG. 4F. As the name suggested, the preview 435 comprises a single frame 436 having a height FH 412 and width 413. Just as with the filmstrip preview, may include a copyright area for providing copyright information relating to the thumbnail preview and certain embodiments may contain an area for a corporate logo or other branding information.

Figure 4A:
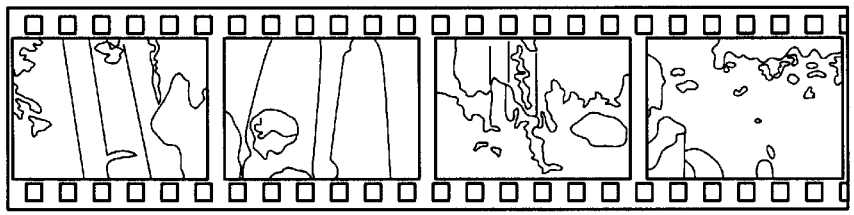
FIG. 4A illustrates a user interface showing search results.
Figure 4B:
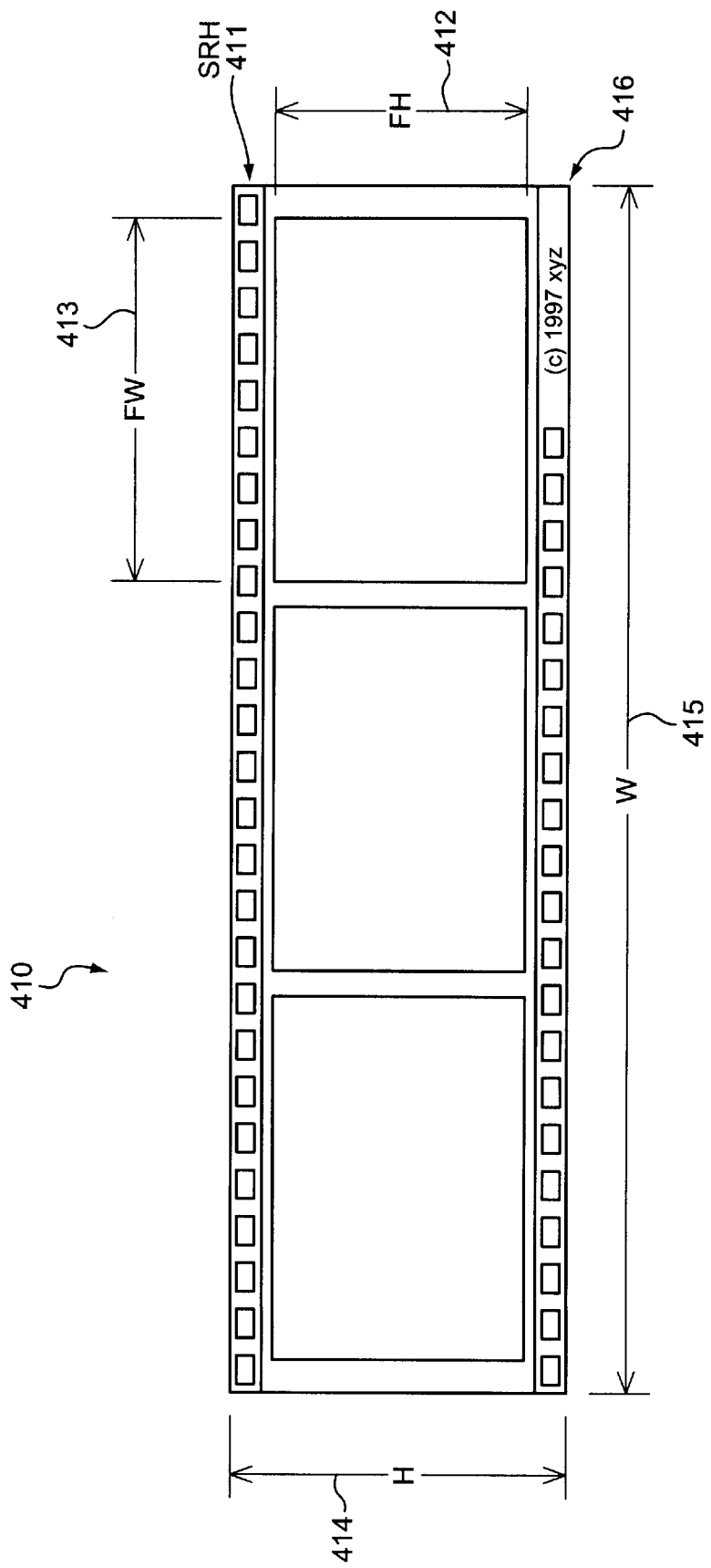
FIG. 4B illustrates components of a preview.

The storyboard preview 438 is explained in greater detail with reference to FIG. 4G. FIG. 4G illustrates a storyboard preview 410. The storyboard preview comprises a background area or border 427 at the top, bottom and sides of the preview, a frame area generally having multiple frames of images of height FH 412 and width FW 413 arranged in row and column format. In one embodiment, the frames are ordered left to right, top to bottom. The storyboard preview may also include a copyright area and an area for a corporate logo or other branding information. Moreover, the frames selected may be arranged in a desired order or sequence different from the sequence of frames inherent in the media content from which the frames were selected. Thus, the frames in storyboard preview 438 are arranged in the following sequence: frames 1, 8, 4, 5, 6, 88, 89, 92, 104, 103, 19, 29, 23, 42 and 66.

Figure 4C:
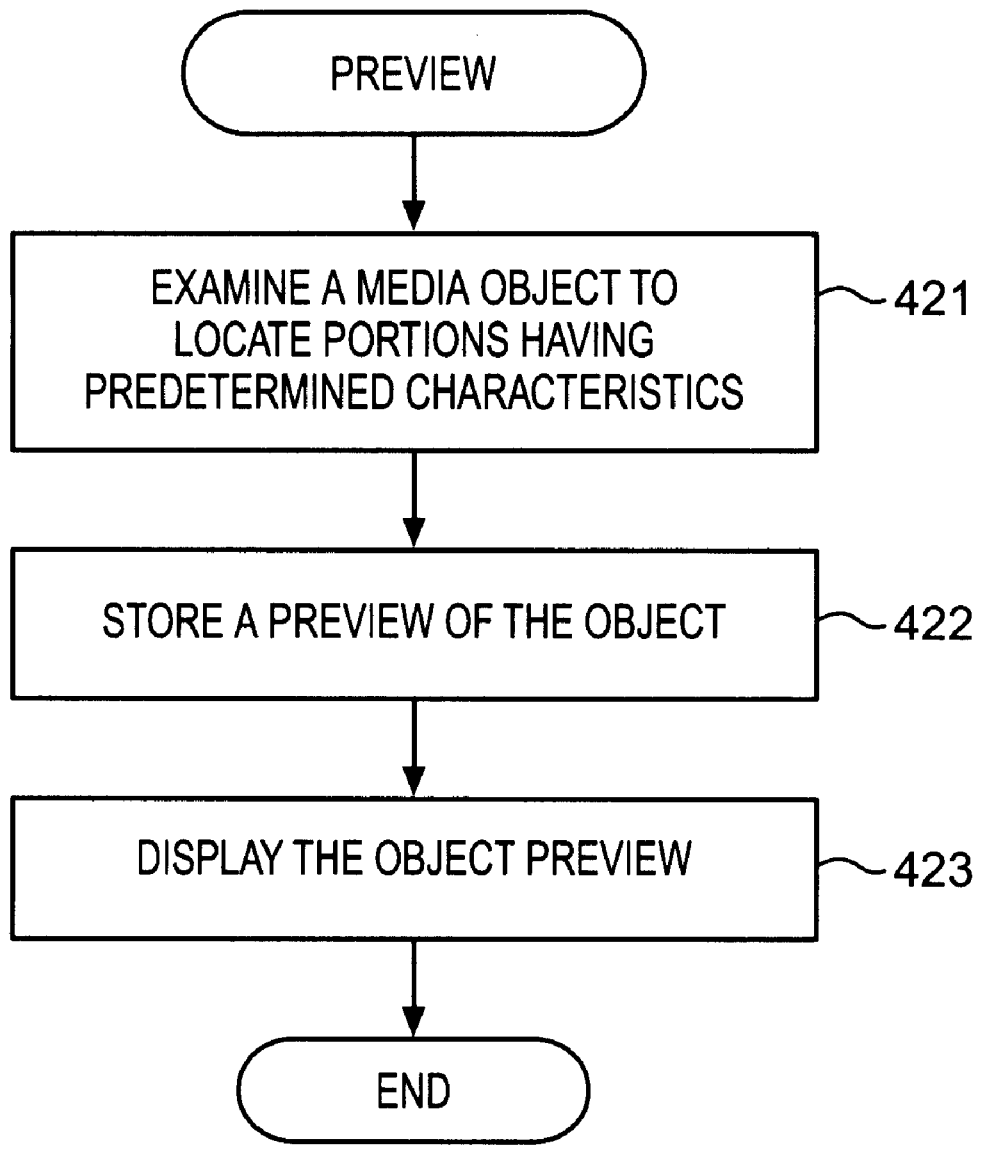
FIGS. 4C–4E illustrate a flow diagram of a method of providing for previews.

A general algorithm for generation and display of previews is disclosed with reference to FIG. 4C. Generally, after finding and/or loading a media object, as was discussed above in Section 2, the media file is examined at block 421 to locate portions having predetermined characteristics. For example, portions of a video file having fast action may be located. Or, portions of a video having black and white portions.

Next, at block 422, a preview of the object is generated and stored. This will be discussed in greater detail in connection with FIG. 4D. Finally, when requested by a user, for example, in response to a search, the preview may be displayed, at block 423.

5.2 Preview Generation

Figure 4D:
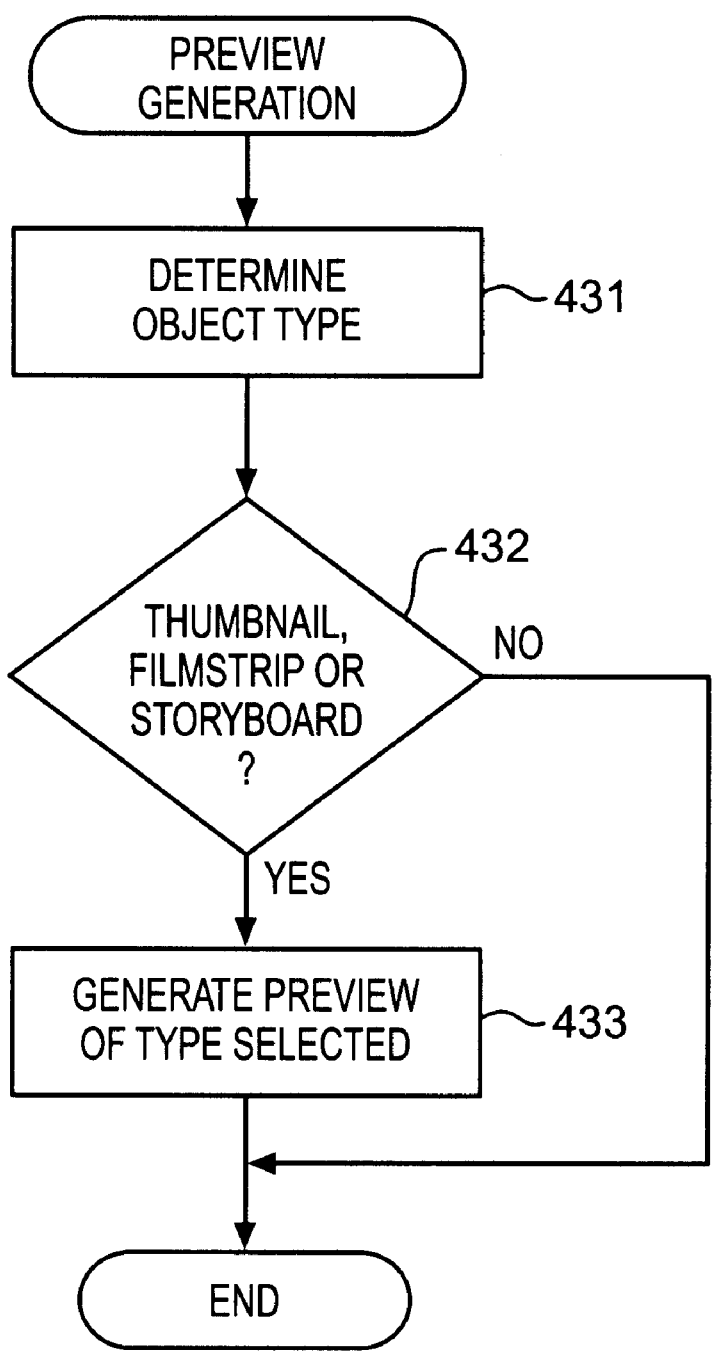
Figure 4E:
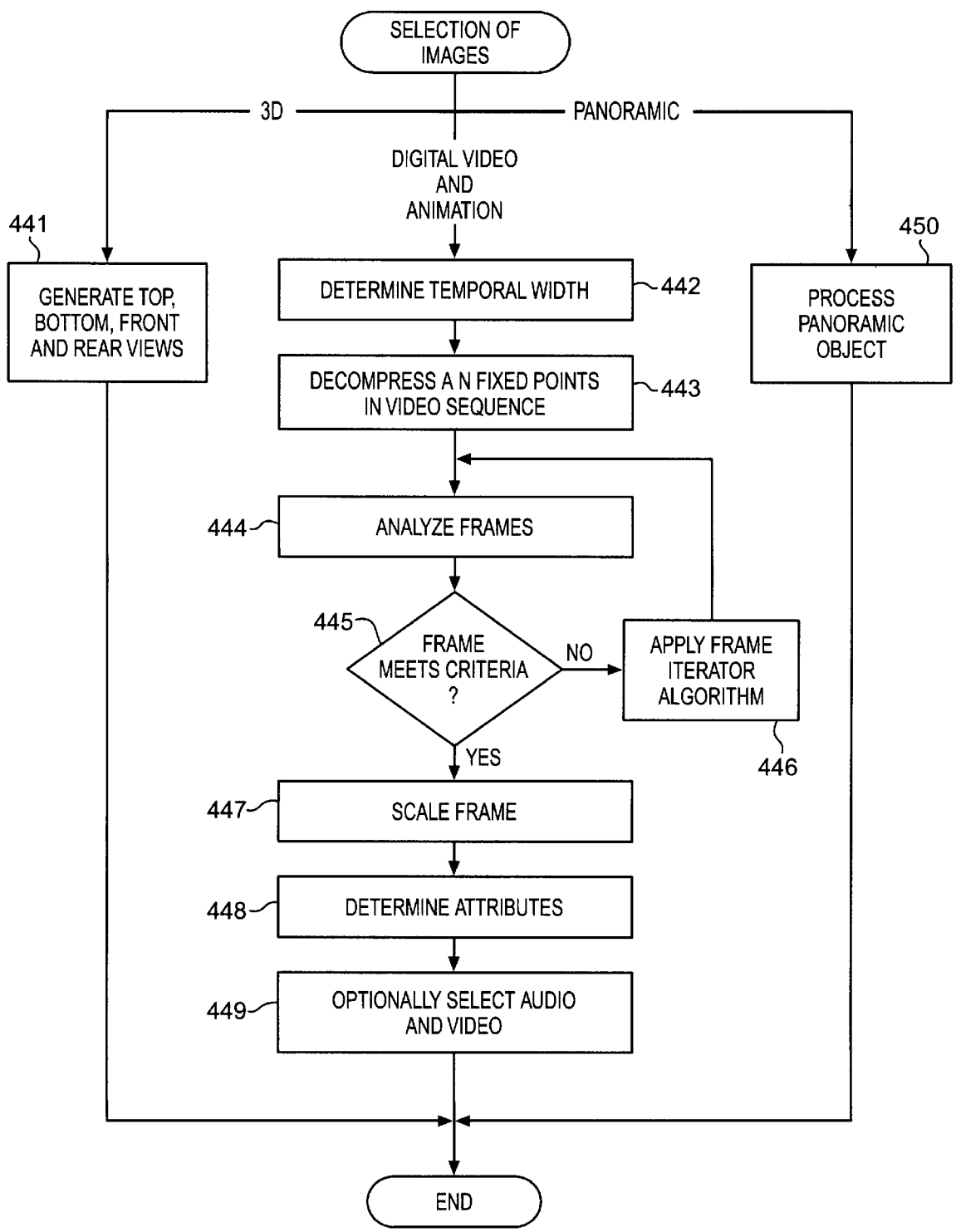

Turning now to FIG. 4D, the process for generation of a preview is discussed in greater detail. Initially, a determination is made of the object type, block 431. The object may be, for example, a digital video file, an animation file, or a panoramic image. In the case of digital video, as was discussed above, the file may be downloadable. If downloadable, the file may have table based frame descriptions or track based frame descriptions. Animation objects include animated series of frames using a lossless differential encoding scheme and hyperlinked animation.

Regardless of the media type, the user selects at block 432 the type of preview desired: thumbnail, filmstrip or storyboard. A preview of the type desired is then generated generally along the lines of the thumbnail preview of FIG. 4F, the filmstrip preview of FIGS. 4A and 4B, or the storyboard preview of FIG. 4G, at block 433. Alternatively, the user may select two or more of the types of previews that may be generated in accordance with an embodiment of the invention.

In yet another embodiment, previews are automatically generated, rather than based on user selection, upon successful indexing or uploading of the media content. Indeed, one or more of the preview types discussed above, namely, the thumbnail, filmstrip and storyboard previews, may be generated. Various criteria may be taken into consideration when automatically generating the previews. For example, the degree of motion in the media content, or picture differences relating to luminance, chrominance, color, or other media attributes may be factored into whether previews are generated automatically. It is appreciated that the previews are generated automatically, or through a combination of manual generation (user selection) and automatic generation.

Regardless of the type of one or more previews generated, whether based on user selection or automatically, one embodiment of the present invention contemplates transcoding the media file content from one file format to another file format. For example, when a media file formatted by Adobe Photoshop is uploadeduploaded, a user is required to use the Adobe Photoshop software application to view any downloaded asset generated therefrom. By transcoding the original media file from a format viewable only by Adobe Photoshop to, say, a JPEG file format, the media file may be viewed with a perhaps more readily available, and less expensive, software application such as a web browser application. An embodiment of the present invention further contemplates one to many transcoding of a media file. Thus, not only does the user have the ability to generate, store and view the media file in its original file format, that is, the same file format as for the media file from which it was generated, the user may also generate, store and view the media file in one or more other file formats. As another example, a MPEG formatted preview generated from an MPEG formatted file may be transcoded into a streaming video file in RealMedia G2 format, as well as into a JPEG file format. Similarly, a Microsoft Office file may be transcoded to an Adobe Acrobat PDF document.

5.2.1 Sizing of preview and images

The sizing of the filmstrip preview and of images is done in the described embodiment as follows:

A) Initially, an aspect ratio is computed for the preview. The aspect ratio is computed as the width of a frame of an image of the object divided by the height of the frame, or $A=FW/FH$.

B) The target filmstrip is set to a width W 415 and a height H. A distance D is set for the distance between frames on the filmstrip. Next, a sprocket height and width is set resulting in a sprocket region height (SRH 411). The particular heights and widths may vary from implementation to implementation depending on a variety of factors such as expected display resolution of the images. In alternative embodiment, differing sprocket designs may be utilized and background colors, etc. may be selected. In certain embodiments, it may be desirable to include copyright information 416 or a logo.

C) In any event, the target height of a filmstrip frame can be computed as $FH=H-(2*SRH)$. The target width of a frame can be computed as a function of the aspect ratio as follows: $FW=A*FH$. The number N of filmstrip frames which will be displayed can then be computed as $N=W/(FW+D)$.

Using the above calculations, the number, width and height of frames can be determined for display of a filmstrip preview. Moreover, the same algorithm is applicable in generating a storyboard preview, which, like a filmstrip preview, comprises multiple frames of an image, but generally more than may be viewed in a single horizontally arranged filmstrip preview.

5.2.2 Structure of Preview

While the previews illustrated in FIGS. 4A, 4B and 4G are a composite comprising multiple frames, in another embodiment, the previews may be non-composite, that is, constructed by concatenating two or more previews each comprising one or more frames. Thus, the preview in FIG. 4B may be comprised of a single preview having three frames, or a concatenation of three previews each having one frame. Likewise, and indeed, to achieve the sequence of frames depicted in the storyboard preview illustrated in FIG. 4G, the storyboard preview is comprised of 12 previews of one frame each (i.e., essentially 12 thumbnail previews), and wherein the multiple previews are concatenated in the sequence selected by the user to form the aggregated storyboard preview. Alternatively, the storyboard preview may be formed by the concatenation, for example, of three filmstrip previews each comprising multiple frames, e.g., 4 frames. The key point here is that the user is able to manipulate the sequence or order of frames into any sequence desired. To accomplish this, the user must be able to select from a plurality of frames to create a preview image, wherein the selected frames are stored and displayed as a single image, or stored and displayed as a plurality of images that are concatenated.

5.2.3 Selection of Frames for Preview Image

The selection of images for use in the preview is dependent on the type of preview desired (e.g., thumbnail, filmstrip, or storyboard), and whether the preview is being generated for a 3D media object, a digital video or animation object, or a panoramic object.

Figure 4F:
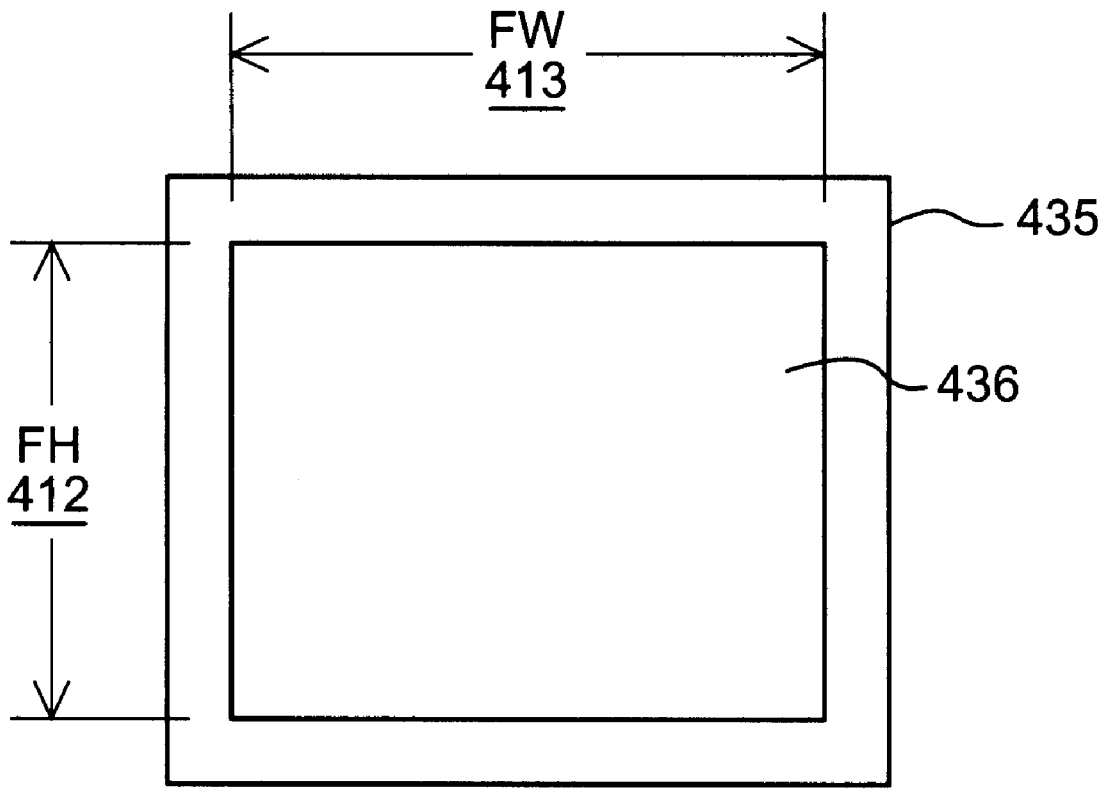
FIGS. 4F and 4G illustrate components of a preview.
Figure 4G:
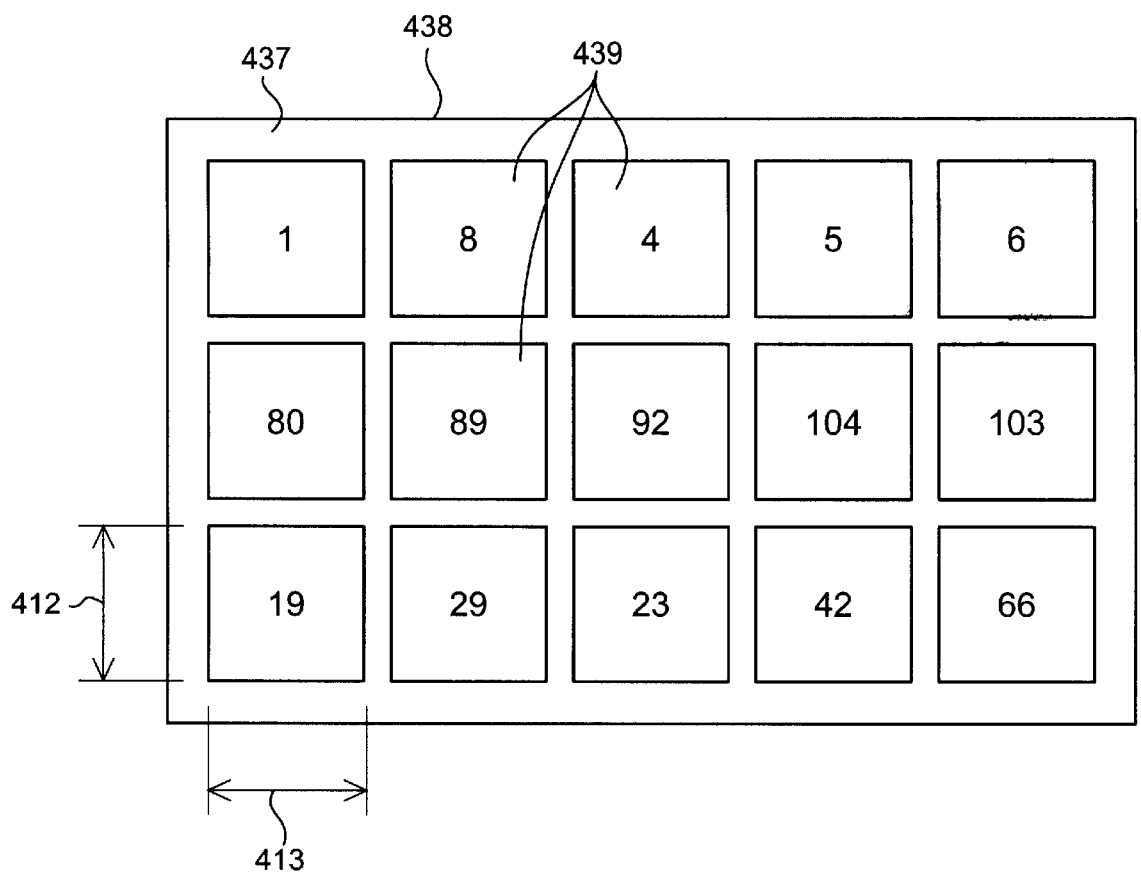

If the user selects the thumbnail preview 435 illustrated in FIG. 4F, then only a single frame 436 of an image is selected for display. The frame is selected in the manner set forth below in sections 4.2.3.1 and 4.2.3.2. The description in the following sections is equally applicable to selection of images for a filmstrip preview or a storyboard preview.

5.2.3.1 Selection of Images—Digital Video and Animation

For digital video or animation sequences, a temporal width TW is calculated, block 442, as $TW=T/(N+1)$ where T is equal to the length (time) of the media object and N is the number of frames calculated as discussed above. N frames from the image are then decompressed to pure RGB at N fixed points in the image where the N fixed points at TW, 2*TW, 3*TW, . . . N* TW time into the media image. This process reduces the need to decompress the entire video file. Scanning to the particular ones of the N frames is accomplished by using the table based frame description, the track based frame description or by streaming dependent on the media source file. An objective of choosing N frames spaced TW apart is to develop a preview with frames from various portions of the media file so that the user will be given an opportunity to review the various portions in making a determination if the user wishes to access the entire file.

The decompressing process may utilize intraframe, predictive decoding or bilinear decoding dependent on the source file. In the described embodiment, a color space conversion is then performed from RGB to YUV. Optionally, an adaptive noise reduction process may be performed.

Each of the N frames is then analyzed to determine if the frame meets predetermined criteria for display, block 444. Again, an objective is to provide the user with a quality preview allowing for a decision as to whether the entire file should be accessed or displayed. In the described embodiment, each of the N frames is analyzed for brightness, contrast and quality. If the frames meet for the criteria, block 445, then the frame is scaled, block 447 from its original width FW and height FH to a scaled width SW and scaled height SH using interpolation. Linear interpolation is utilized and the aspect ratio is maintained.

Each frame is also analyzed for a set of attributes, block 448. The attributes in the described embodiment include brightness, contrast (luminance, deviation), chrominance, and dominant color. Brightness indicates the overall brightness of digital video clip. Color indicates if the video clip is in full color or black and white, and contrast indicates the degree of contrast in the movie. These high level content attributes tend to be more meaningful for the typically short video sequences which are published on the Internet and Intranet. The computation for each of the attributes is detailed below. This information can then be used for enhanced searching. For example, chrominance can be used for searching for black and white versus color video. In addition, embodiments may provide for optionally storing a feature vector for texture, composition and structure. These attributes can be averaged across the N frames and the average for each attribute is stored as a searchable metric. In addition, optionally, the contrast of the frames may be enhanced using a contrast enhancement algorithm.

We will now briefly describe computation of the chrominance, luminance and contrast values. The maximum chrominance is computed for the selected N frames in the video sequence. The maximum chrominance for the set of frames is then determined by finding the maximum chrominance for each frame by finding the maximum chrominance for all pixels in each frame. This maximum chrominance value for the set of selected frames is then compared against a threshold. If the maximum chrominance for the sequence is larger than the threshold, then the sequence is considered in full color. If the maximum chrominance for the sequence is smaller than the threshold, then the sequence is considered in black and white.

The luminance is computed for the selected N frames in the video sequence. The luminance is then averaged into a single scalar value.

To determine contrast, luminance values are computed for each frame of the digital video sequence. The luminance values which fall below the fifth percentile, and above the ninety-fifth percentile are then removed from the set of values. This is done to remove random noise. The remaining luminance values are then examined for the maximum and minimum luminance. The difference between the maximum and minimum luminance is computed as the contrast for a single frame. The contrast value is then computed for all frames in the sequence, and the average contrast is stored as the resulting value.

Finally, audio and video clips may be associated with each frame, block 449. For audio, a standard audio segment may be selected or alternatively an audio selection algorithm may be applied which finds audio that meets predetermined criteria, such as a preset volume level. For video, a video track of duration VD is selected. The video selection may be a standard video segment or the video segment may be selected using a video selection algorithm which selects video segments meeting a predetermined criteria such as video at a predetermined brightness, contrast or motion.

Going back to analysis of the frames, if one of the N frames does not meet the criteria, block 445, a frame iterator algorithm is applied to select a new frame. The frame iterator algorithm of the described embodiment selects another frame by iteratively selecting frames between the frame in question and the other frames until a frame is found which meets the criteria or until a predetermined number of iterations have been applied. If the predetermined number of iteration is applied without successfully finding a frame that meets the criteria, the originally selected frame is used. The algorithm starts with the original frame at TW (or, 2*TW, 3*TW . . . N* TW) and selects, first, a frame at TW-(TW/2) (i.e., a frame halfway between the original frame and the beginning). If this frame does not meet the criteria, a frame at TW+(TW/2) is selected and iteratively frames are selected according to the pattern:

((TW-(TW/2)), (TW+(TW/2), (TW-(TW/4)), (TW+(TW/4), . . . (TW-(TW/X)), (TW+(TW/X)).

5.4 Interactive Display of Search Results

When returning search results from a user's multimedia query to a database, it is disclosed to generate appropriate commands to drive a web browser display to facilitate interactive viewing of the search results. Depending on the position a user selects (for example with a mouse or other cursor control device) within a preview of the media content shown in the search result, the user will begin interaction with the content at different points in time or space. The end result is a more useful and interactive experience for a user employing a multimedia search engine.

For example, if a user searches for videos of a car, then the web server application can return a series of HTML and EMBED tags that setup a movie controller, allowing a user to interact with the videos of cars. When the low bandwidth preview (a filmstrip showing select scenes of the video clip) is presented to a user, the position of the mouse that is active when a user clicks within the preview will drive the resulting EMBED tags which are created and then returned from the server. For example:

if a user clicks down in frame X of a filmstrip, then an in-line viewer is created which will begin display and playback of the movie at frame X. In an alternative embodiment, a snippet or short segment of a video or audio file may be stored with the preview and associated with a particular portion of the preview. This method avoids the need to access the original file for playback of a short audio or video segment.

if a user clicks down at pan angle X, tilt angle Y and fov Z within a panorama filmstrip, then an in-line viewer is created which will begin display of the panorama at those precise viewing parameters.

if a user clicks down within a select viewpoint of a 3D scene within a filmstrip, then an in-line viewer is created which will begin display of the 3D scene at that viewpoint.

if a user clicks down within an audio waveform at time T, then an in-line viewer is created which will begin playback of the sound at that particular time T.

By allowing users to drive the points in time or space where their display of interactive media begins, users can more precisely hone in on the content they are looking for. For example, if a user is looking for a piece of music which has a certain selection which is very loud, they may observe the volume increase in the graphical waveform display, click on that portion of the waveform and then hear the loud portion of the music. This takes them directly to the selection of interest.

5.5 Use of Media Icons to illustrate search results

When returning search results from a user's multimedia query to a database, the described embodiment provides for both a text and visual method for showing that the search results are of different media types. For example, when executing a search for the word "karate", it is possible that numerous search results will be returned, including digital video, audio, 3D, animation, etc. Video may show karate methods, sound might be an interview with a karate expert, 3D could be a simulation of a karate chop and animation a display of a flipbook of a karate flip. In order to enable a viewer to rapidly scan a page and distinguish the different media types, an icon which is representative of each type of media is employed.

By using a universal set of icons as shown in the figures for media types, it enhances the ability of users to scan a page of search results and quickly jump to those responses that are most relevant. In addition, the use of media icons can transcend barriers of language and culture, making it easier for people from different cultures and speaking different languages to understand search results for multimedia queries.

5.6 Selection of basic, detailed or visual results

In the described embodiment, users can select basic, detailed or visual search results. If a user selects visual search results, then only visual images, filmstrips or waveforms are presented to users as search results. The visual search results are typically displayed as a set of mosaics on a page, usually multiple thumbnail images per row, and multiple filmstrips (usually two) per row. Clicking on images, waveforms or filmstrips then takes users to new web pages where more information is described about the media content. This allows users to rapidly scan a page of visual search results to see if they can find what they are looking for.

5.7 Timecode based display

Text keywords may be found within certain multimedia files (e.g., the content of the file). For example, movie and other video files sometimes contain a movie text track, a closed caption track or a musical soundtrack lyrics track. For each text keyword that is found in one of these tracks, a new database is created by the process of the present invention. This database maps keywords to [text, timecode] pairs. This is done so that it is possible to map keywords directly to the media file and timecode position where the media file text reference occurs. The timecode position is subsequently used when producing search results to viewers, so that the viewers can jump directly to that portion of the media sequence where the matching text occurs.

ALTERNATIVES TO THE PREFERRED EMBODIMENT OF THE PRESENT INVENTION

There are, of course, alternatives to the described embodiments that are within the reach of one of ordinary skill in the relevant art. The present invention is to be limited only by the claims presented below.

What is claimed is:

1. A method comprising:
    a) transferring files identified by a user from a source location at which the user found the files to a central location specified by the user, the files comprising media content;
    b) generating multiple files having transcoded formats for each of the files;
    c) receiving user annotations comprising free form textual comments and selected data regarding the media content of the files;
    d) storing the user annotations as metadata in association with the files;
    e) indexing for each one of the files textual data from within the file, a filename for the file, and the metadata;
    f) generating multiple types of previews for each of the files;
    g) receiving queries from a user regarding the metadata and media content at the central location;
    h) selecting files comprising media content responsive to the user queries;
    i) providing the transcoded formats of the files; and
    j) providing the multiple types of previews of the selected files, and metadata associated therewith, for retrieval by the user.

2. The method of claim 1, wherein the source location comprises a file folder on a server accessible to the user.

3. The method of claim 1, wherein the source location comprises a hypertext markup language (HTML) directory on a hypertext transfer protocol (HTTP) server accessible to the user.

4. The method of claim 1, wherein the transferring files identified by the user comprises transferring copies of the files to the central location.

5. The method of claim 1, wherein the source location comprises a permanent storage device accessible to the user.

6. The method of claim 1, wherein the source location comprises a file server accessible to the user.

7. The method of claim 1, wherein the multiple types of previews comprise thumbnail previews.

8. The method of claim 1, wherein the multiple types of previews comprise filmstrip previews.

9. The method of claim 1, wherein the multiple types of previews comprise storyboard previews.

10. The method of claim 1, wherein the method is performed by a multi-tier application service comprising logical components of an application server, web server, database server, and media server.

11. The method of claim 10, wherein the logical components reside on a distinct physical server.

12. The method of claim 10, wherein each tier of the multi-tier application is replicated one or more times in a clustered representation and runs on separate physical servers.

13. The method of claim 10, wherein the web server is in a physical location separate from the applications server and the database server, and the web server is connected to the application server and the database server via dedicated, high-speed network connections.

14. The method of claim 1, wherein one or more of the files identified by the user reside in disparate geographic locations.

15. The method of claim 1, wherein the generating multiple files having transcoded formats for each of the files comprises converting the media content of the files to multiple alternative representations while preserving the media content of the files.

16. The method of claim 1, wherein the metadata further comprises content attributes.

17. The method of claim 1, wherein the media content comprises corporate, office, and rich media multi-image content distribution and text.

18. The method of claim 17, wherein the media content comprises one or more of the following: a Microsoft PowerPoint presentation, an Excel spreadsheet, and a Word document.

19. The method of claim 1, wherein the media content supported includes complex content type.

20. The method of claim 1, wherein the multiple types of previews comprise steaming previews.

21. The method of claim 1, wherein the multiple types of preview comprise low-bandwidth preview of high bandwidth files.

22. A method comprising:
   a) a computer uploading files from a source location to a central location specified by a user and accessible to the computer, the files comprising media content;
   b) the computer receiving user input to monitor the source location for new media content at the source location;
   c) the computer automatically uploading files comprising new media content from the source location when the new media content is detected by the computer;
   d) the computer receiving queries from a user regarding the media content;
   e) the computer selecting media content responsive to the user queries; and
   f) the computer providing a preview of the selected media content for retrieval by the user.

23. The method of claim 22, wherein the computer receiving user input to monitor the source location for new media content at the source location comprises the computer receiving user input setting forth a set of predetermined characteristics other than a set of predetermined characteristics that were received as input to the computer in uploading files comprising media content from the source location to the central location.

24. The method of claim 22, wherein the computer receiving user input to monitor the source location for new media content at the source location comprises the computer receiving user input setting forth a set of predetermined characteristics that were received as input to the computer in uploading files comprising media content from the source location to the central location.

25. The method of claim 22, wherein the computer receiving user input to monitor the source location for new media content at the source location comprises the computer invoking an agent to monitor the source location for new media content at the source location in response to the user input.

26. The method of claim 22, wherein the computer automatically uploading files comprising new media content from the source location when the new media content is detected by the computer, comprises the computer from the source location when the new media content is detected by the computer, comprises the computer automatically uploading files comprising new media content from the source location when a comparison by the computer of the attributes associated with the files at the source location and metadata associated with the files at the central location indicate the existence of new media content.

27. The method of claim 22 further comprising the computer providing a plurality of transcoded file formats containing the selected media content for retrieval by the user.

28. The method of claim 22 further comprising the computer providing multiple types of previews of the selected media content for retrieval by the user.

29. A method comprising:
   a) receiving input from a user, the input comprising one or more source directories from which to transfer files comprising media content, and a central location identifying where to transfer the files;
   b) traversing all paths within the one or more source directories in search for the files;
   c) transferring all the files comprising media content found within the one or more source directories to the central location;
   d) transferring metadata associated with the files to a metadata database at the central location;
   e) receiving user annotations comprising free form textual comments and selected data regarding the media content of the files;
   f) storing the user annotations as metadata in association with the files;
   g) indexing for each one of the files textual data from within the file, a filename for the file, and the metadata;
   h) generating multiple types of previews for each of the files;
   i) receiving queries from a user regarding the metadata and media content at the central location;
   j) selecting files comprising media content responsive to the user queries; and
   k) providing the multiple types of previews of the selected files, and metadata associated therewith, for retrieval by the user.

30. The method of claim 29, wherein the one or more source directories comprise a hypertext markup language (HTML) directory.

31. The method of claim 30, wherein a web browser application traverses all paths within the HTML directory in search for the files.

32. The method of claim 29, wherein the one or more source directories comprise a file system directory.

33. The method of claim 22, wherein a file finder application traverses all paths within the file system directory in search for the files.

34. The method of claim 29 further comprising:
   generating multiple files having transcoded formats for each of the files; and
   providing the transcoded formats of the files.

35. A computer readable medium in or over which instructions are received, that when executed by a processor, cause the processor to:
   a) transfer files identified by a user from a source location at which the user found the files to a central location specified by the user, the files comprising media content;
   b) generate multiple files having transcoded formats for each file;

c) receive user annotations comprising free form textual comments and selected data regarding the media content of the files;

d) store the user annotations as metadata in association with the files;

e) index for each one of the files textual data from within the file, a filename for the file, and the metadata;

f) generate multiple types of previews for each of the files;

g) receive queries from a user regarding the metadata and media content at the central location;

h) select files comprising media content responsive to the user queries;

i) provide the transcoded formats for the files; and j) provide the multiple types of previews of the selected files, and metadata associated therewith, for retrieval by the user.

36. The computer readable medium of claim 35, wherein the source comprises a file folder on a server accessible to the user.

37. The computer readable medium of claim 35, wherein the source comprises a hypertext markup language (HTML) directory on a hypertext transfer protocol (HTTP) server accessible to the user.

38. The computer readable medium of claim 35, wherein the transferring files identified by the user comprises transferring copies of the files to the central location.

39. The computer readable medium of claim 35, wherein the source location comprises a permanent storage device accessible to the user.

40. The computer readable medium of claim 35, wherein the source location comprises a file server accessible to the user.

41. The computer readable medium of claim 35, wherein the multiple types of previews comprise thumbnail previews.

42. The computer readable medium of claim 35, wherein the multiple types of previews comprise filmstrip previews.

43. The computer readable medium of claim 35, wherein the multiple types of previews comprises storyboard previews.

44. The computer readable medium of claim 35, wherein the method is performed by a multi-tier application service comprising logical components of an application server, web server, database server and media server.

45. The computer readable medium of claim 35, wherein the method is performed by a multi-tier application service comprising logical components of an application server, web server, database server and media server, where each logical component resides on a distinct physical server.

46. The computer readable medium of claim 35, wherein the method is performed by a multi-tier application service comprising logical components of an application server, web server, database server and media server, where each logical component resides on a distinct physical server and each tier of the application is replicated one or more times in a clustered representation and runs on separate physical servers.

47. The computer readable medium of claim 35, wherein the application and web servers are separate physical servers, and the database server is at a separate, central location.

48. A computer readable medium in or over which instructions are received, that when executed by a processor, cause the processor to:

a) receive input from a user, the input comprising one or more source directories from which to transfer files comprising media content, and a central location identifying where to transfer the files;

b) traverse all paths within the one or more source directories in search for the files;

c) transfer all the files comprising media content found at the one or more source directories to the central location;

d) transfer metadata associated with the files to a metadata database at the central location;

e) generate multiple files having transcoded formats for each of the files;

f) receive user annotations comprising free form textual comments and selected data regarding the media content of the files;

g) store the user annotations as metadata in association with the files;

h) index for each one of the files textual data from within the file, a filename for the file, and the metadata;

i) generate multiple types of previews for each of the files;

j) receive queries from a user regarding the metadata and media content at the central location;

k) select files comprising media content responsive to the user queries;

l) provide the transcoded formats for the files; and m) provide the multiple types of previews of the selected files, and metadata associated therewith, for retrieval by the user.

49. The computer readable medium of claim 48, wherein the user input comprising the source directory comprises a hypertext markup language (HTML) directory.

50. The computer readable medium of claim 48, wherein a web browser application traverses all paths within the HTML directory in search for the files.

51. The computer readable medium of claim 48, wherein the user input comprising the source directory comprises a file system directory.

52. The computer readable medium of claim 51, wherein a file finder application traverses all paths within the file system directory in search for the files.

53. A computer-implemented method comprising:

a) uploading files from a source location to a central location specified by a user and accessible to a computer, the files comprising media content;

b) receiving user input to monitor the source location for new media content at the source location;

c) automatically uploading files comprising new media content from the source location when the new media content is detected by the computer;

d) receiving queries from a user regarding the media content;

e) selecting media content responsive to the user queries; and f) providing a preview of the selected media content for retrieval by the user.

54. The method of claim 53, wherein the receiving user input to monitor the source location for new media content at the source location comprises receiving user input setting forth a set of predetermined characteristics other than a set of predetermined characteristics that were received as input in uploading files comprising media content from the source location to the central location.

55. The method of claim 53, wherein the receiving user input to monitor the source location for new media content at the source location comprises receiving user input setting forth a set of predetermined characteristics that were received as input in uploading files comprising media content from the source location to the central location.

56. The method of claim 53, wherein receiving user input to monitor the source location for new media content at the source location comprises invoking an agent to monitor the source location for new media content at the source location in response to the user input.

57. The method of claim 53, wherein the automatically uploading files comprising new media content from the source location when the new media content is detected, comprises automatically uploading files comprising new media content from the source location when a comparison of the attributes associated with the files at the source location and metadata associated with the files at the central location indicate the existence of new media content.

58. The method of claim 53 further comprising providing a plurality of transcoded file formats containing the selected media content for retrieval by the user.

59. The method of claim 53 further comprising providing multiple types of previews of the selected media content for retrieval by the user.

* * * * *